3,019,520
PIPE CRIMPING APPARATUS
Kenneth C. Woolley, Houston, Tex., assignor to Tex-Tube, Inc., Houston, Tex., a corporation of Texas
Filed Jan. 23, 1961, Ser. No. 84,273
7 Claims. (Cl. 29—234)

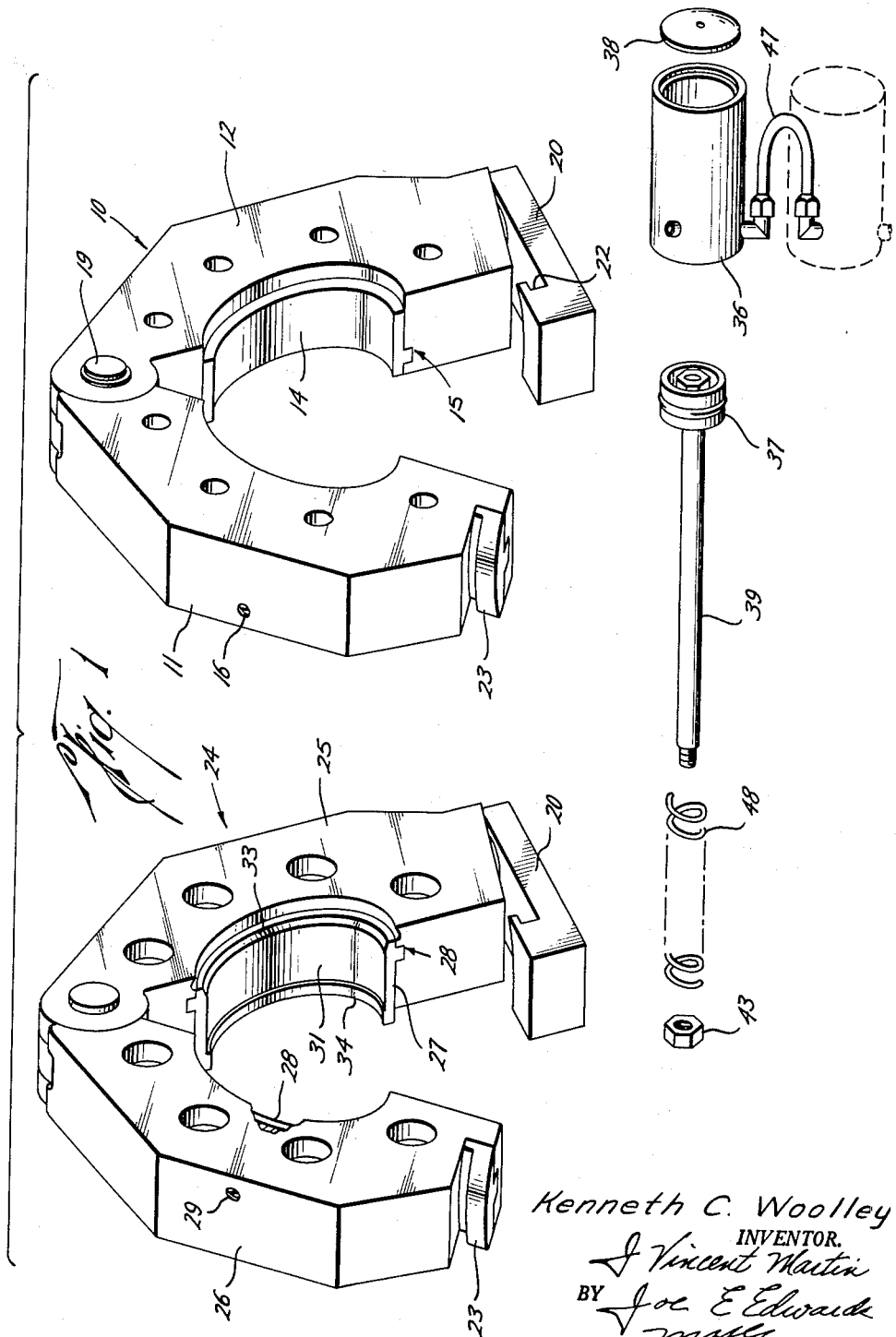

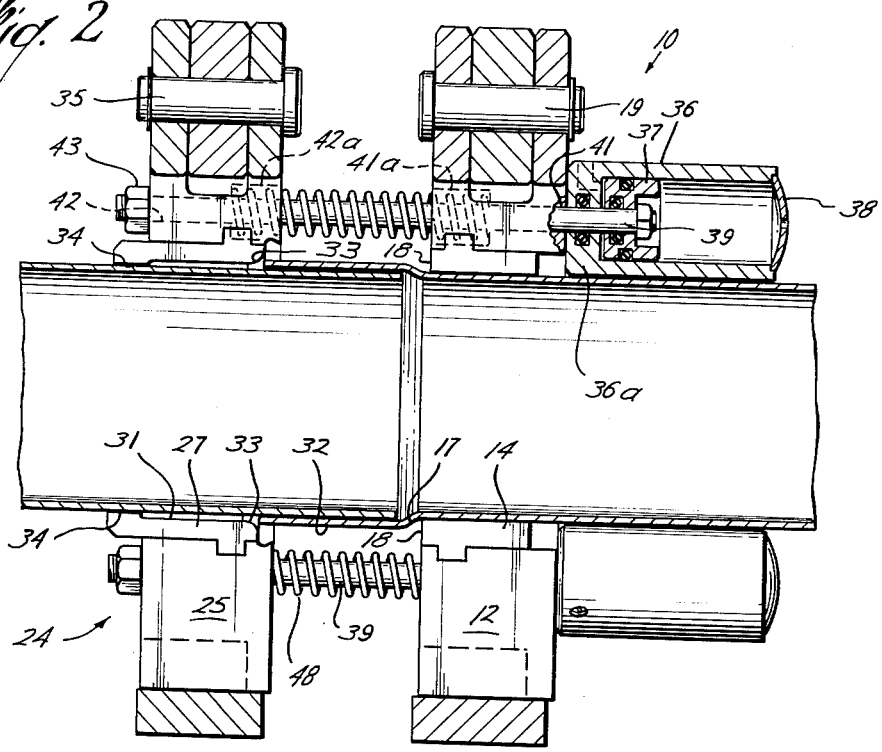
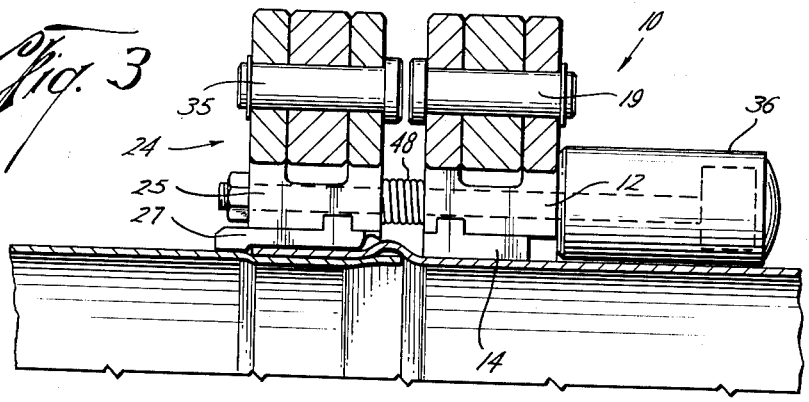

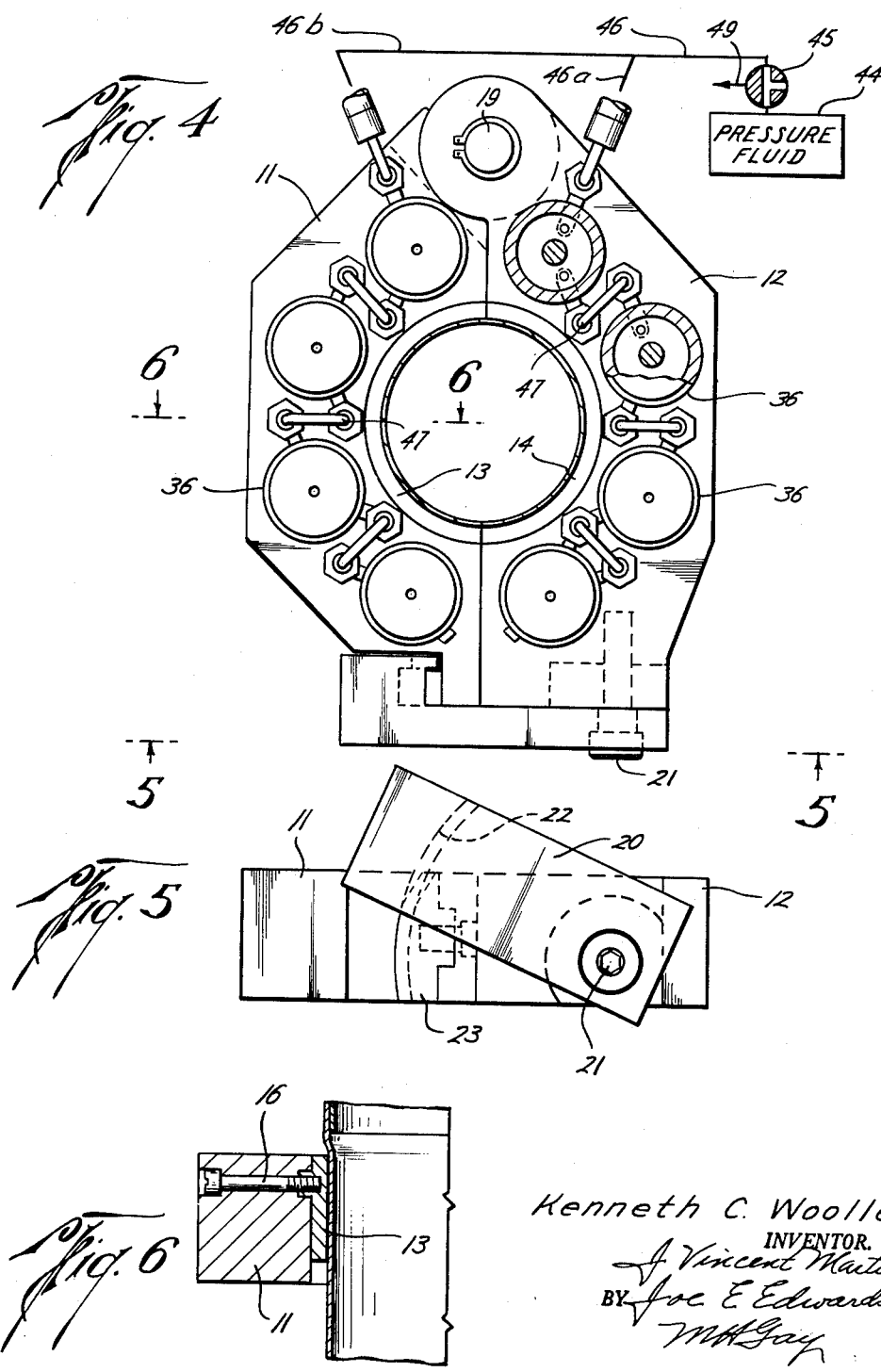

This invention relates to apparatus for crimping pipe, and more particularly to an apparatus for crimping belled end pipe by progressively reducing in an axial direction the diameter of the belled end of a pipe to crimp such belled end and the pin end of another pipe together.

It is an object of this invention to provide an apparatus for joining bell and pin end pipe together in which the apparatus crimps the bell end of the pipe in a manner to tightly control and grip the pin end of another pipe.

Another object is to provide an apparatus for crimping the bell end of a pipe about the pin end of another pipe which crimps the pipe in such a manner that the tendency of the crimped bell to spring back toward its original diameter after being crimped is substantially eliminated.

Another object is to provide apparatus for crimping bell and pin end pipes together by reducing the diameter of the bell.

Another object is to provide a simple, portable crimping apparatus for joining thin-wall, bell-end pipe together by crimping which substantially eliminates the tendency of the crimped bell to spring back toward its original diameter.

Other objects, features and advantages of the invention will be apparent from the drawings, the specification and the claims.

In the drawings, wherein like reference numerals indicate like parts, and wherein an illustrative embodiment of this invention is shown:

FIGURE 1 is an exploded isometric view of a crimping apparatus constructed in accordance with this invention with only one of the hydraulic jacks and return springs illustrated below the die means;

FIGURE 2 is a view in vertical cross section through madeup sections of bell end pipe and through the crimping apparatus of FIGURE 1 shown in crimping position about the pipe;

FIGURE 3 is a fragmentary view similar to FIGURE 2 showing the pipe and crimping apparatus after the pipe has been crimped and before the apparatus has been removed from about the pipe;

FIGURE 4 is a view in end elevation of the pipe-crimping apparatus illustrated;

FIGURE 5 is a view along the lines 5—5 of FIGURE 4; and

FIGURE 6 is a view along the lines 6—6 of FIGURE 4.

In utilizing the apparatus of this invention the bell and pin ends of two pipes are made up together and then the bell end of one pipe is crimped over the pin end of the other pipe. If desired, the exterior of the pin and interior of the bell may be coated with a suitable adhesive such as one of the epoxy resins or other adhesives suitable for securing pipe together.

As it may be desired to secure pipe sections together at a multitude of locations, the crimping apparatus of this invention includes a fixed die means located generally at 10 for fixing the apparatus about a pipe to be crimped.

The fixed die means includes a split die holder provided by die holder sections 11 and 12. The fixed die holder sections are generally semi-circular in configuration so that when closed the fixed die means will have an annular configuration complementary to a pipe to be crimped. The fixed die means also includes an annular split holding die insert provided by two semi-circular die insert sections 13 and 14 carried by die holder sections 11 and 12, respectively. The die inserts are secured in place in the die holders by an interlocking tongue and groove indicated generally at 15 and bolts 16 which secure the die sections in the die holder sections.

The holding die means has an inner diameter provided by the inner diameter of the die inserts 13 and 14 which is substantially equal to the outer diameter of the pipe to be crimped. By the outer diameter of the pipe to be crimped is meant the normal outer diameter of the pipe and not including the belled end section. By substantially equal to this outer diameter of the pipe is meant that the inner diameter of the holding die means will be such that the holding die means will fit about the pipe without excessive looseness or clearance to permit it to engage the root 17 of the bell section of the pipe and anchor the crimping apparatus on the pipe.

This engagement of the holding die means with the root of the bell end of the pipe is preferably provided for by an endwise facing shoulder on the holding die means. This may be provided by the endwise facing shoulder 18 on the holding die insert.

Means are provided for securing the split die means together. Preferably, this means is provided by the pivot pin 19 securing two ends of the die holder sections 11 and 12 together in a manner to permit them to open and be inserted over a pipe and then close about the pipe.

A latch means for releasably securing the free ends of the split die means together about a pipe is provided by a movable cam member 20 mounted on the die holder section 12 by a suitable pivot pin 21. The movable cam member has a cam surface 22 which engages the cam insert 23 carried by movable die holder 11 to latch the split sections of the fixed die means together.

Movable annular split die means indicated generally at 24 is provided for movement over the bell end of a pipe to be crimped and when so moved progressively reduces the diameter of the bell in an axial direction to crimp two pipes together in a manner which substantially eliminates the tendency of the pipe to spring back toward its original diameter. The movable die means is split into sections and preferably includes the movable die holder sections 25 and 26 which are generally semi-circular in configuration. The movable die means preferably includes an annular split die insert formed in two semi-circular sections 27 and 28 and carried respectively by movable die holder sections 25 and 26. As in the case of the fixed die inserts, the movable die inserts are preferably provided by two identical semi-circular members. They are secured in the movable die holder sections by a tongue and groove engagement indicated generally at 28 and bolts 29.

The movable die insert provides within the movable die means an internal cylindrical section 31 which has a diameter between the outer diameter of the pipe and the outer diameter of the bell end 32 of the pipe.

The movable die insert also provides in the movable die means a curved throat section 33 of varying radius when viewed in cross-section. At its smallest diameter the throat section joins the cylindrical section 31 of the movable die insert and curves gently outwardly therefrom to a diameter greater than the outer diameter of the bell end of the pipe to be crimped. As the movable die passes over the bell end of the pipe the throat section 32 reduces the diameter of the bell end of the pipe and thereafter the cylindrical section 31 of the movable die insert sizes the bell end of the pipe as the movable die means passes thereover.

The movable die means is provided with guide means to maintain the movable die means concentric with the pipe which it surrounds. Preferably, this guide means is provided by a section 34 of reduced diameter on the movable die insert. This section is preferably of a diameter substantially equal to the diameter of the pipe to be crimped so that it will engage the pin end of one of the pipes to be crimped together and hold the movable die means concentrically thereabout.

The split sections of the movable die means are preferably held together at one adjacent end of the split sections by pivot pin 35 which secures adjacent ends of the movable die holder sections 25 and 26 together. The pivotal connection provides for opening and closing the movable die means for movement over a pipe after which the sections of the movable die means may be moved together about the pipe.

Latch means are provided for releasably securing the free ends of the movable die means together. This latch means is identical to that employed on the fixed die means and includes the movable cam 20 secured to the movable die holder section 25 by a bolt 21 and cooperable with a die insert 23 to releasably latch and secure the free ends of the movable die holder sections 25 and 26 together about a pipe.

Means are provided for moving the movable die means toward the fixed die means by a plurality of hydraulic jacks spaced symmetrically about the fixed and movable die means and securing the fixed and movable die means together.

Each hydraulic jack includes a cylinder 36 having a piston 37 reciprocal therein. The cylinder 36 has a closed end 36a which is positioned adjacent to and abuts an end face of the fixed die means. The other end of the cylinder is closed by a suitable dust cover 38. A rod 39 extends from the piston 37 through a bore 41 in the fixed die means. The rod 39 also extends through a bore 42 in the movable die means and a nut 43 on the free end of the rod secures the hydraulic jack to the fixed and movable die means.

As best seen in FIGURE 4, a number of these hydraulic jacks which are identical in construction are arranged symmetrically about the fixed and movable die means.

A suitable hydraulic fluid from a source of fluid under pressure indicated schematically at 44 is selectively directed to the several hydraulic jacks through a three-way valve 45 and line 46 which has two flexible branch sections 46a and 46b communicating with the bank of hydraulic jacks carried by the respective split portions of the fixed and movable dies. As best seen in FIGURE 4, the hydraulic jacks of each bank communicate with each other through conduits 47 so that as hydraulic pressure is applied to the crimping apparatus it will be applied substantially equally to all of the hydraulic jacks so that the force of the hydraulic fluid will be applied simultaneously about the entire circumference of the movable die means to draw it over the bell end 32 of one pipe and crimp this bell end to the pin end of another pipe.

For ease in handling the apparatus, it is preferred that the fixed and movable die means be urged away from each other during positioning of the apparatus about a pipe. This objective may be carried out by providing a plurality of resilient means such as springs 48 about a number of the rods 39. Preferably, the bore 41 in the fixed die holder is counterbored as indicated at 41a, and the bore 42 in the movable die holder is counterbored as indicated at 42a to receive the free ends of the springs 48.

In operation, the belled end pipes to be crimped together have their pin and bell ends thoroughly cleaned. If desired, a suitable adhesive is applied to the pin and bell and preferably the two pipes are rotated relative to each other to evenly distribute the adhesive. The crimping apparatus is then opened and placed about the pipe with the fixed die means surrounding the normal diameter of the pipe and having its endwise face 18 abutting the root 17 of the belled end 32 of the pipe. This will position the movable die means as indicated in FIGURE 2 with throat 32 of the movable die insert closely adjacent the belled end of the pipe. The two latch means are manipulated to secure the sections of the fixed and movable die means together. Three-way valve 45 is then manipulated to place the source of hydraulic fluid under pressure in communication with line 46. This pressure fluid is effective under each of the pistons 37 to move the movable die means over the bell of the pipe to be crimped toward the fixed die means, that is, from the FIGURE 2 position to the FIGURE 3 position. As the movable die means progresses over the bell, the bell is progressively reduced in diameter in an axial direction by the throat 33, and as each section of the bell comes out from under the throat 33 it is sized by the cylindrical section 31 of the movable die.

After the crimping operation has been completed, the valve 45 is manipulated to disconnect the high pressure source of fluid from the several hydraulic jacks and to connect line 46 to a return line 49 which returns the hydraulic fluid to the source. As the latch means are released, the springs 48 will return the fixed and movable dies to the relationship shown in FIGURE 2. At this time the hydraulic fluid under pistons 37 will be returned through line 49 to the source of pressure fluid. The crimping apparatus is now ready for reuse.

The foregoing disclosure and description of the invention is illustrative and explanatory thereof and various changes in the size, shape and materials, as well as in the details of the illustrated construction, may be made within the scope of the appended claims without departing from the spirit of the invention.

What I claim is:

1. Apparatus for crimping together sections of belled end pipe comprising, fixed annular split die means having an inner diameter substantially equal to the outer diameter of the pipe to be crimped and having an endwise facing annular shoulder for engaging the root of the bell of a pipe to be crimped, means for pivotally securing the split sections of the fixed die means together, latch means for releasably securing the free ends of the fixed die means together when placed about a pipe to be crimped, movable annular split die means having an internal cylindrical section of a diameter between the outer diameter of a pipe to be crimped and the outer diameter of the bell end of said pipe, said movable die means having an outwardly curved throat radius section commencing at one end of the cylindrical section and extending outwardly to a diameter greater than the outer diameter of the bell end of the pipe to be crimped, means for pivotally securing the split section of the movable die means together, latch means for releasably securing the free ends of the movable die means together when placed about the pipe to be crimped, and means for moving said movable die means toward said fixed die means.

2. Apparatus for crimping together sections of belled end pipe comprising, fixed annular split die means having an inner diameter substantially equal to the outer diameter of the pipe to be crimped and having an endwise facing annular shoulder for engaging the root of the bell of a pipe to be crimped, means for pivotally securing the split sections of the fixed die means together, latch means for releasably securing the free ends of the fixed die means together when placed about a pipe to be crimped, movable annular split die means having an internal cylindrical section of a diameter between the outer diameter of a pipe to be crimped and the outer diameter of the bell end of said pipe, said movable die means having an outwardly curved throat radius section commencing at one end of the cylindrical section and extending outwardly to a diameter greater than the outer diameter of the bell end of the pipe to be crimped, means for pivotally securing the split section of the movable die means together, latch means for releasably securing the free ends of the movable die means together when placed about the pipe to be crimped, means for moving said movable die means toward said fixed die means, and means urging the two die means away from each other.

3. Apparatus for crimping together sections of belled end pipe comprising, fixed annular split die means having an inner diameter substantially equal to the outer diameter of the pipe to be crimped and having an endwise facing annular shoulder for engaging the root of the bell of a pipe to be crimped, means for pivotally securing the split sections of the fixed die means together, latch means for releasably securing the free ends of the fixed die means together when placed about a pipe to be crimped, movable annular split die means having an internal cylindrical section of a diameter between the outer diameter of a pipe to be crimped and the outer diameter of the bell end of said pipe, said movable die means having an outwardly curved throat radius section commencing at one end of the cylindrical section and extending outwardly to a diameter greater than the outer diameter of the bell end of the pipe to be crimped, means for pivotally securing the split section of the movable die means together, latch means for releasably securing the free ends of the movable die means together when placed about the pipe to be crimped, means for moving said movable die means toward said fixed die means, and guide means on said movable die means defining an annular guide surface whose diameter is substantially the diameter of the pipe to be crimped to position the movable die means concentrically about the pipe to be crimped.

4. Apparatus for crimping together sections of belled end pipe comprising, fixed annular split die means having an inner diameter substantially equal to the outer diameter of the pipe to be crimped and having an endwise facing annular shoulder for engaging the root of the bell of a pipe to be crimped, means for pivotally securing the split sections of the fixed die means together, latch means for releasably securing the free ends of the fixed die means together when placed about a pipe to be crimped, movable annular split die means having an internal cylindrical section of a diameter between the outer diameter of a pipe to be crimped and the outer diameter of the bell end of said pipe, said movable die means having an outwardly curved throat radius section commencing at one end of the cylindrical section and extending outwardly to a diameter greater than the outer diameter of the bell end of the pipe to be crimped, means for pivotally securing the split section of the movable die means together, latch means for releasably securing the free ends of the movable die means together when placed about the pipe to be crimped, a plurality of hydraulic jacks carried by and fastening said fixed and movable die means together at symmetrically arranged points about said fixed and movable die means, and a source of hydraulic fluid under pressure for simultaneously operating the jacks to move the movable die means toward the fixed die means.

5. Apparatus for crimping together sections of belled end pipe comprising, a fixed annular split die holder, an annular split holding die insert in said die holder having an inner diameter substantially equal to the outer diameter of the pipe to be crimped and having an endwise facing annular shoulder for engaging the root of the bell of a pipe to be crimped, means for pivotally securing the split sections of the fixed die holder together, latch means for releasably securing the free ends of the fixed die holder together when placed about a pipe to be crimped, a movable annular split die holder, a movable annular split die insert in said movable holder, said movable die insert having an internal cylindrical section of a diameter between the outer diameter of a pipe to be crimped and the outer diameter of the bell end of said pipe, said movable die insert having an outwardly curved throat radius section commencing at one end of the cylindrical section and extending outwardly to a diameter greater than the outer diameter of the bell end of the pipe to be crimped, means for pivotally securing the split sections of the movable die holder together, latch means for releasably securing the free ends of the movable die holder together when placed about a pipe to be crimped, and means for moving said movable die holder toward said fixed die holder.

6. Apparatus for crimping together sections of belled end pipe comprising, a fixed annular split die holder, an annular split holding die insert in said die holder having an inner diameter substantially equal to the outer diameter of the pipe to be crimped and having an endwise facing annular shoulder for engaging the root of the bell of a pipe to be crimped, means for pivotally securing the split sections of the fixed die holder together, latch means for releasably securing the free ends of the fixed die holder together when placed about a pipe to be crimped, a movable annular split die holder, a movable annular split die insert in said movable holder, said movable die insert having an internal cylindrical section of a diameter between the outer diameter of a pipe to be crimped and the outer diameter of the bell end of said pipe, said movable die insert having an outwardly curved throat radius section commencing at one end of the cylindrical section and extending outwardly to a diameter greater than the outer diameter of the bell end of the pipe to be crimped, means for pivotally securing the split sections of the movable die holder together, latch means for releasably securing the free ends of the movable die holder together when placed about a pipe to be crimped, guide means on said second split die insert defining an annular guide surface whose diameter is substantially the diameter of the pipe to be crimped to position the movable die holder concentrically about the pipe to be crimped, means urging the two die holders away from each other, a plurality of hydraulic jacks carried by and fastening said die holders together at symmetrically arranged points about the die holders, and a source of hydraulic fluid under pressure for simultaneously operating the jacks to move the second die holder toward the first die holder.

7. Apparatus for crimping together sections of belled end pipe comprising, fixed annular split die means, means for pivotally securing the split sections of the fixed die means together, latch means for releasably securing the free ends of the fixed die means together when placed about a pipe to be crimped, means on the fixed die means for preventing movement thereof in an axial direction over the belled end of a pipe within the fixed die means, movable annular split die means having an internal cylindrical section of a diameter between the outer diameter of a pipe to be crimped and the outer diameter of the bell end of said pipe, said movable die means having an outwardly curved throat radius section commencing at one end of the cylindrical section and extending outwardly to a diameter greater than the outer diameter of the bell end of the pipe to be crimped, means for pivotally securing the split sections of the movable die means together, latch means for releasably securing the free ends of the movable die means together when placed about the pipe to be crimped, and means for moving said movable die means toward said fixed die means.

References Cited in the file of this patent

UNITED STATES PATENTS

| | | |
|---|---|---|
| 1,894,835 | Smith et al. | Jan. 17, 1933 |
| 2,381,747 | Howe | Aug. 7, 1945 |